United States Patent [19]
Ahrweiler et al.

[11] 3,965,769
[45] June 29, 1976

[54] ROLLER CHAINS FOR A CONTINUOUS PRESS

[75] Inventors: Karl-Heinz Ahrweiler, Krefeld; Valentin Appenzeller, Kempen, Ndrh.; Kurt Quoos, Krefeld; Eduard Küsters, Krefeld-Forstwald, all of Germany

[73] Assignee: Eduard Kuesters Maschinenfabrik, Krefeld, Germany

[22] Filed: Nov. 4, 1974

[21] Appl. No.: 520,863

Related U.S. Application Data

[62] Division of Ser. No. 308,556, Nov. 12, 1972, Pat. No. 3,851,685.

[30] Foreign Application Priority Data

Nov. 22, 1971 Germany............................ 2157746
Oct. 5, 1972 Germany............................ 2248760

[52] U.S. Cl.................................. 74/245 R; 59/84; 144/281 B; 198/183
[51] Int. Cl.²........................ G01F 3/14; B27D 3/04
[58] Field of Search............... 74/251, 245 R, 245 S, 74/245 LP; 59/78, 84, 90, 95; 198/183, 184, 129, 189; 144/242 D, 245 R, 245 A, 281 R, 281 A, 281 B

[56] References Cited
UNITED STATES PATENTS 3,029,086  4/1962  Stokvis........................ 74/245 R X
3,147,844  9/1964  Mountz........................... 198/183 X

*Primary Examiner*—Othell M. Simpson
*Assistant Examiner*—W. D. Bray
*Attorney, Agent, or Firm*—Kenyon & Kenyon Reilly Carr & Chapin

[57] ABSTRACT

A continuous press has two rotatively driven endless conveyor belts forming opposed, substantially linear spans defining a pressing zone, press platens applying pressure through these traveling spans to work carried therebetween, and anti-friction means being interposed between the platens and the spans. Such a press is improved in that the anti-friction means is formed by a multiplicity of endless loops of rotatively unpowered roller chains forming a bed interposed between the platens and the belt spans, the roller chain spans extending longitudinally with respect to the belt spans and being transversely packed together, but each chain being individually free to travel independently with respect to the others and to the belt span. The chains are formed so as to not have a continuous link gap so that the overall path is free from transverse interspacing.

14 Claims, 11 Drawing Figures

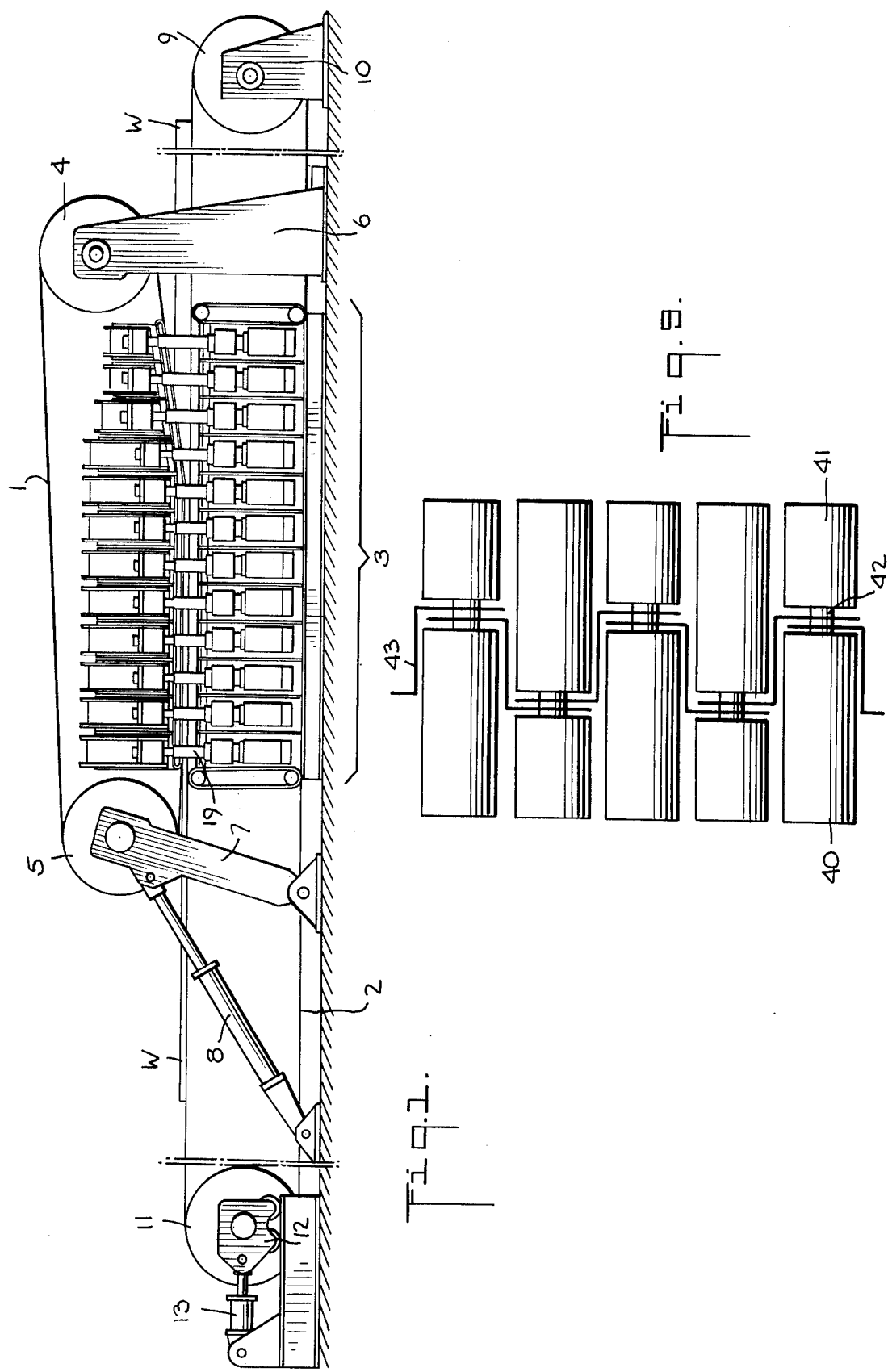

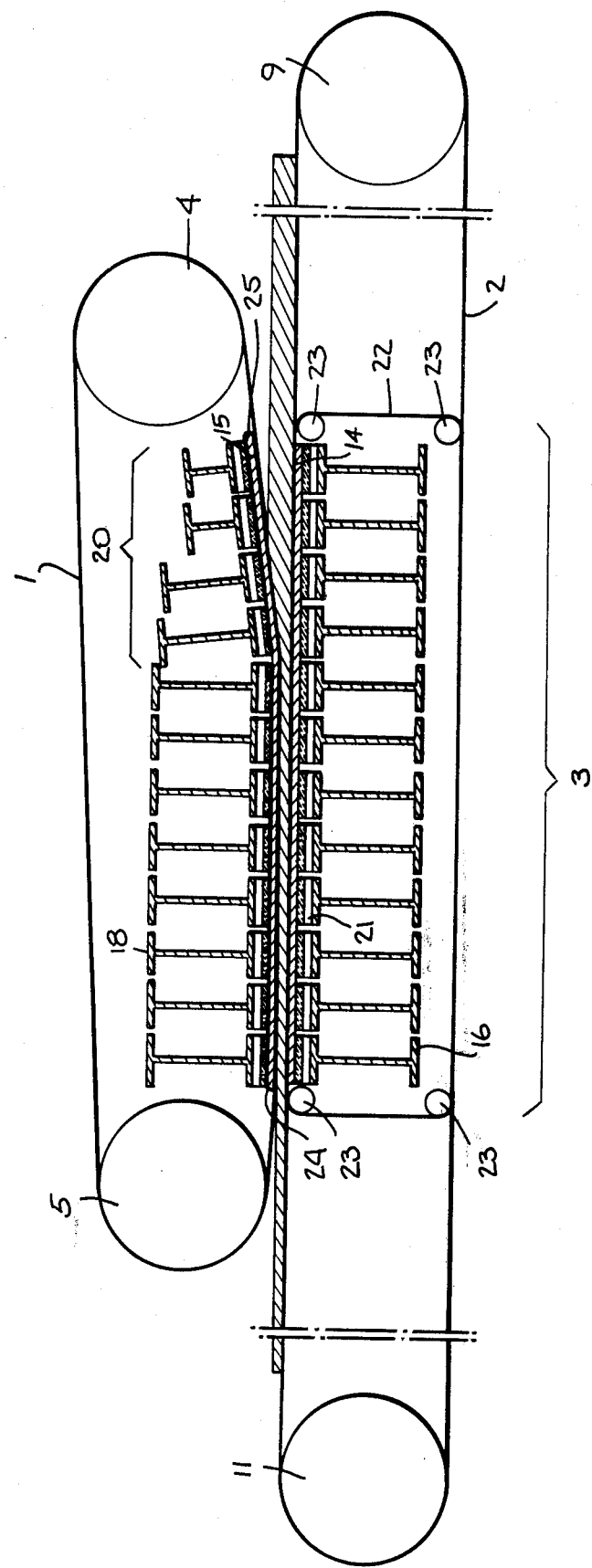

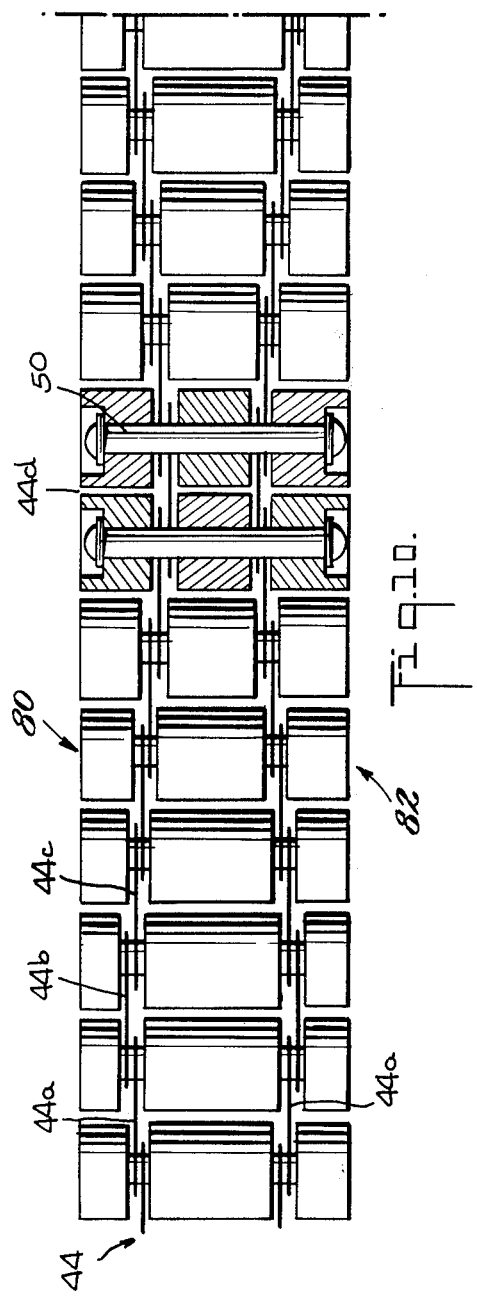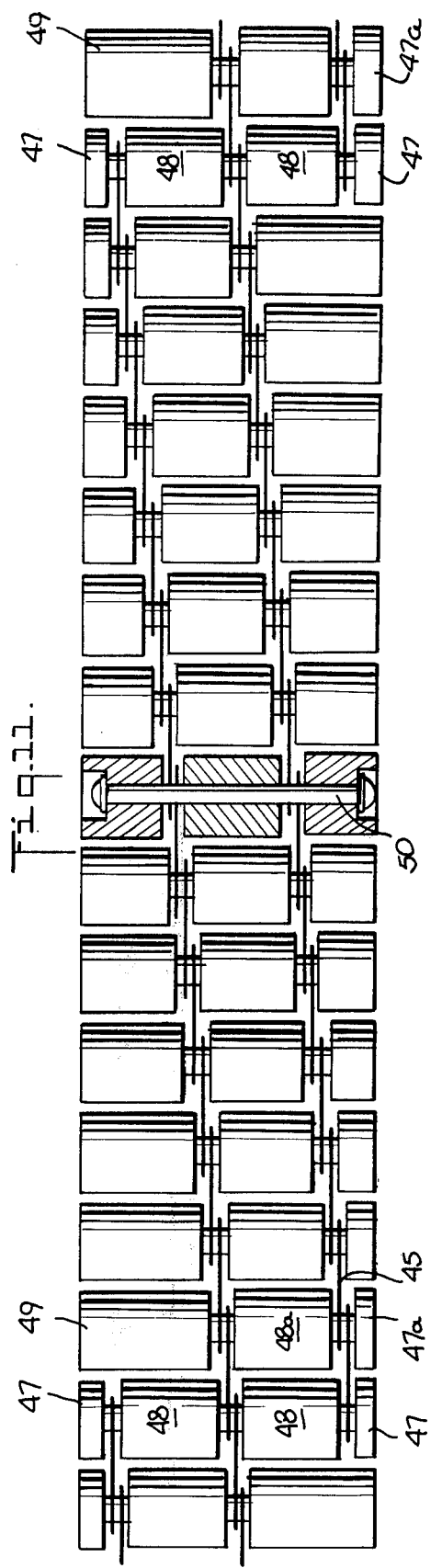

3,965,769

ROLLER CHAINS FOR A CONTINUOUS PRESS

RELATED APPLICATION

This application is a division of application Ser. No. 308,556 filed Nov. 12, 1972, now U.S. Pat. No. 3,851,685.

BACKGROUND OF THE INVENTION

This invention relates to continuous presses of the type including endless loops formed by longitudinally and transversely flexible conveyor belts which form opposed, substantially linear spans defining a pressing zone. Means are provided for rotatively driving one or both of the loops to drive the spans in the same direction, and press platens apply pressure through the traveling spans to the work carried therebetween. Antifriction means are interposed between the platens and the spans for obvious reasons. Such presses are used for the manufacture of wood-chip board, laminated products, minerally-bonded construction boards or plates, for sintering sheets of polytetrafluorethylene, etc.

When, to manufacture wood-chip board for example, such a press is used for the consolidatin of the woodchips, the flexible belt spans through which the pressing pressure is transmitted, may locally flex and stretch unpredictably, and the above-mentioned anti-friction means should be capable of operating satisfactorily under such random stressing conditions. Similar conditions are not encountered by either roller or ball bearings in general, because rigid bearing races apply the load uniformly throughout the rolling elements.

DESCRIPTION OF THE PRIOR ART

However, more recent prior art suggestions in the direction of providing anti-friction means for continuous presses have, in general, attempted to borrow from the anti-friction roller and ball bearing art.

For example, at an earlier time the Beard Patent 2,142,932, Jan. 3, 1939, suggested the use of rollers extending for the full width of the belt spans defining the pressing zone. The ends of these rollers are linked together to form roller loops having spans between the conveyor belt spans and the press platens, at least one of the latter being formed by a fluid-filled cushion so that the rollers vertically receive uniform pressure lengthwise. But in a horizontal plane, these full-length rollers receive the random stressing and must constantly flex while rotating, an operating condition known to lead to early fatigue failure of metal. Also, such stressing produced skewing forces which must be restrained by the journals in which the rollers necessarily run in the links which interconnect them. Beard does not suggest that this construction is suitable for the manufacture of chip-board.

Therefore, borrowing from the anti-friction bearing art to relieve the rolling elements from such flexure and skewing, the Berger U.S. Pat. No. 3,120,862, Feb. 11, 1964, suggests the elimination of the flexible conveyor belt and its substitution by a chain made of long and strong links interconnected to permit looping and the formation of the two conveyor spans between the press platens. The patent suggests that with this construction either roller or ball bearing elements may be used between these links and the press platens. Both the links and the press platens are grooved to form rigid bearing races holding the rollers or balls in alignment, which involves expensive precision machining operations. The rolling elements may be caged to form endless loops or run as loose elements. The links required for cooperation with the press platens to form the typical bearing, races, although linear instead of circular, involve large engineering and manufacturing costs.

SUMMARY OF THE INVENTION

The object of the present invention is to provide for an improved roller chain in a continuous press of the type described, the chains having sets of axially aligned rollers of different lengths with longer rollers of one set opposite shorter rollers of the next set so that they effect transversely offset rolling paths free from transverse interspacing.

In the disclosed apparatus, the flexible conveyor belts are used, in particular, belts made of strip steel having a gauge in the area of 1 mm. thickness. This has the advantage of low cost, imperviousness and effective heat and pressure transmission properties.

Between these belt spans forming the pressing zone, and the press platens, a multiplicity of rotatively unpowered endless loops of roller chains are used, these being packed transversely together to form a bed interposed between the platens and the steel strip conveyor belts. The chains are not only unpowered, but also each chain is individually free to travel independently with respect to the others as well as the belt spans themselves. For a belt width in the area of 2 or 2.5 meters, more than 100 of these chains may run side-by-side, each individually free to adopt any traveling velocity independently of all of the others. Each chain is free to change in velocity with respect to the steel belts. The individual rollers are, for all practical purposes, entirely free from horizontal flexure and skewing stresses caused by belt flexure or stretching because each roller is so very short in length individually and does not span the belt areas under deformation. Skewing forces are translated into individual accelerating and decelerating velocities of the various chains. Flexure stresses only result in the chains moving relative to each other.

The two outermost chains of each roller chain bed are guided against transverse displacement, thus holding all of the chains packed therebetween from displacement. There is no need for expensive precision machining operations to form bearing races in the platens.

In accordance with the present invention special roller chains which avoid transverse interspacing are provided. To accomplish this, the roller link plates may be modified either by making them with transversely offset portions or by modifying their normal overlapping relationship, permitting the use of rollers of differing lengths having overlapping travel paths.

DESCRIPTION OF THE DRAWINGS

Preferred embodiments of the present invention are illustrated by the accompanying drawings in which:

FIG. 1 is a side elevation of a continuous press in which the chains of the present invention may be used;

FIGS. 7 and 8 are like FIGS. 5 and 6, respectively, but show modifications;

FIG. 9 is a schematic illustration of a first embodiment of the present invention showing transversely off set chain plates with the rollers of differing lengths to provide overlapping roller paths;

FIGS. 10 and 11, each partly sectioned, illustrate further embodiments of the present invention in which rollers are interfastened by differently overlapped link plates to permit the use of rollers of differing lengths to provide overlapping rolling paths.

DESCRIPTION OF THE PREFERRED EMBODIMENTS

Figure 3:
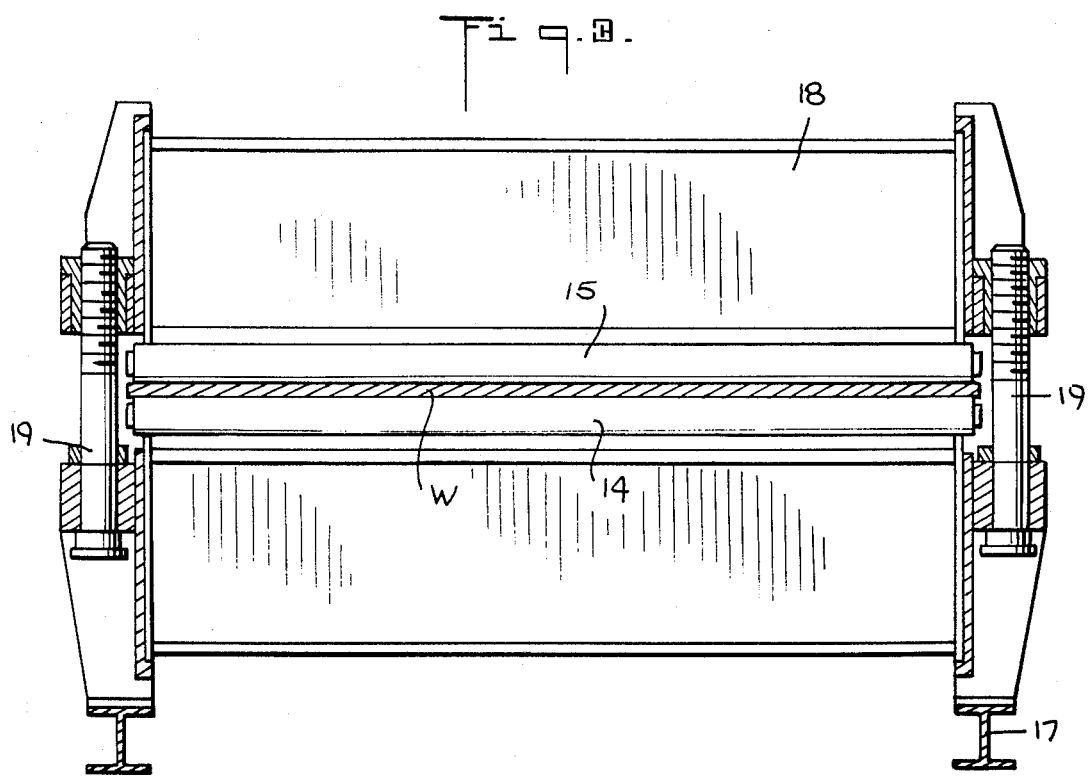
FIG. 3 is a cross section of the press.

FIG. 1 shows the upper and lower endless conveyor belt loops 1 and 2 respectively, which form opposed, substantially linear spans defining the pressing zone embraced by the bracket 3. These belts are made of thin strip steel having a thickness of about 1 to 1.5 mm. and are flexible both longitudinally and transversely. The upper belt 1 is looped around rotative drums 4 and 5, the drum 4 being fixed against lateral motion by being journaled in stationary pedestals 6; the drum 5 being capable of lateral motion by being journaled in swinging arms 7 provided with suitable swinging means 8 which provide for the application of proper tension to this upper belt. The lower belt 2 at one end loops around a rotative drum 9 which is also fixed against lateral motion by being journaled in stationary pedestals 10, the other end of this lower loop passing around a rotative drum 11 journaled in sliding mountings 12 pulled by suitable actuating means 13 so that the tension of the lower belt loops may be properly attained.

The work W enters at the right-hand end of the press in FIG. 1, and comes out the left-hand end with a reduced thickness, assuming wood-chip board or the like is being made.

As shown by FIG. 3 the working spans of the two belts in the zone 3 are pressed together by press platens 14 and 15, the lower platen 14 being held against downward motion by transverse I-beams 16 supported by base members 17 which extend longitudinally for the length of the press. The upper platen 15 is supported by transverse I-beams 18 which can be pulled downwardly by suitable actuators 19 which may be either of the motorized mechanical screw type or hydraulically actuated. There are a plurality, or series, of these beams 16 and 18 and each of the upper beams 18 is provided with its own pair of actuators 19.

Figure 2:
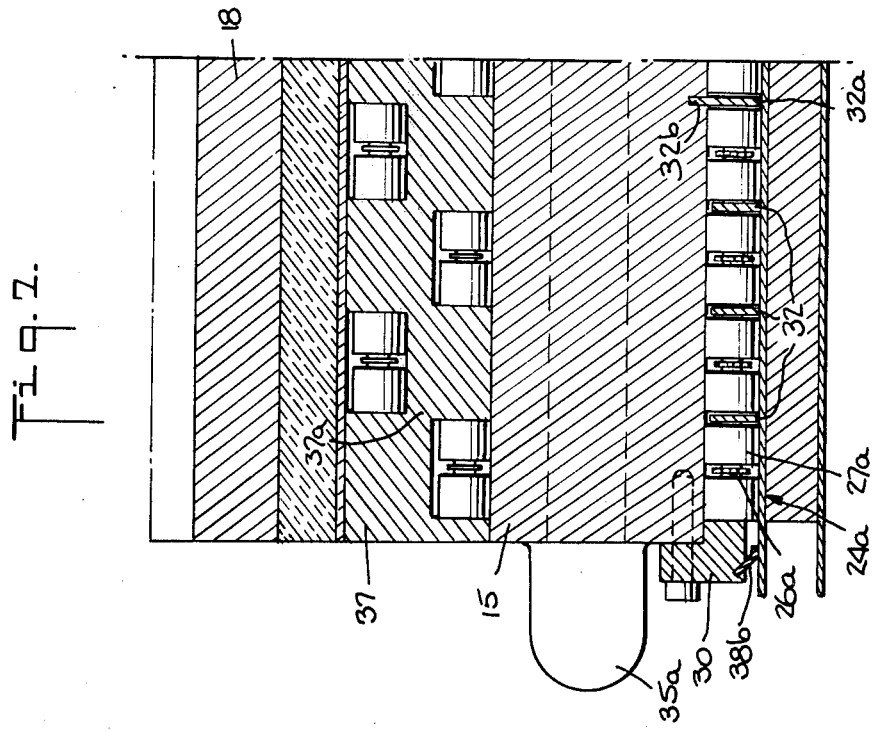
FIG. 2 is a longitudinal vertical section of that press shown very schematically.

The platens 14 and 15 each extend for the full length of the zone 3 as one-piece constructions, excepting that, as suggested in FIG. 2, the upper one may be in two sections to define a converging entrance zone for the work so that the latter can receive a gradually increasing pressure as it initially enters the press. Although the beams 16 and 18 are shown as being relatively massive and, therefore, very resistant to beam stress, it is still possible for them to deflect slightly under the loading applied by the actuators 19. Should this deflection be troublesome, hollow cushions may be used between the beams and the platens, these cushions extending for the full length of the beams with which they are used and being made of flexible sheet metal, for example, and filled with fluid under pressure sufficient to carry the loading to which the beams are subjected. With such an arrangement beam deflection is not transmitted to the platens. In schematic FIG. 2 such cushions are indicated at 21. They may be used between any of the beams or all of the beams whenever needed to obtain a uniform loading throughout the widths of the platens.

The roller chain loops providing the anti-friction means between these platens and the steel strip conveyor belt spans throughout the pressing zone 3, are generally indicated in FIG. 2, the roller chains 22 extending between the lower belt 2 and the lower platen 14 and being individually looped by individual looping sprocket wheels 23 appropriately positioned and which are unpowered and rotatively free from one another. It can be seen that these roller chain loops 22 encircle both the lower platen 14 and its supporting beams 16. By lengthening the upper belt loop 1, the same arrangement could be used for the upper roller chain loops 24 which must run between the upper belt loop and the upper platen 18; but by specially designing the upper platen, as disclosed hereinafter, the chain loops 24 may be much more compactly arranged as is very generally indicated by FIG. 2.

Figure 4:
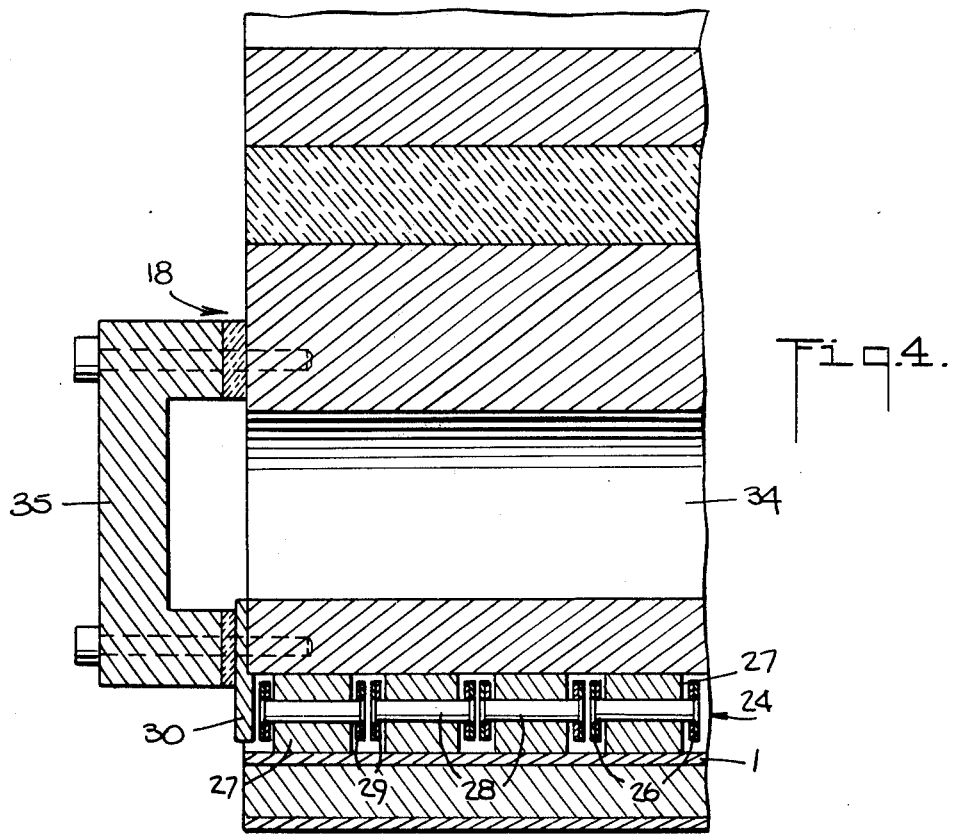
FIG. 4 is a vertical cross section showing only a small portion of an upper press platen with the roller chains transmitting its force to the steel strip conveyor belts.
Figure 6:
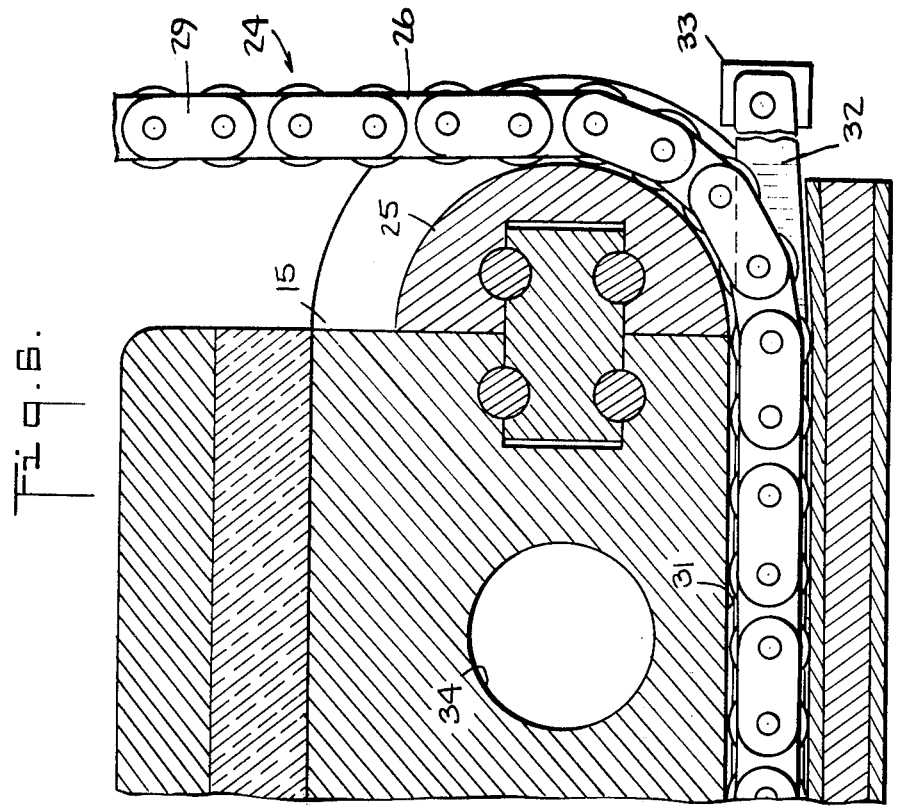
FIG. 6 is a vertical longitudinal section of the entering end portion of an upper platen, showing the ends of the chain loops.
Figure 5:
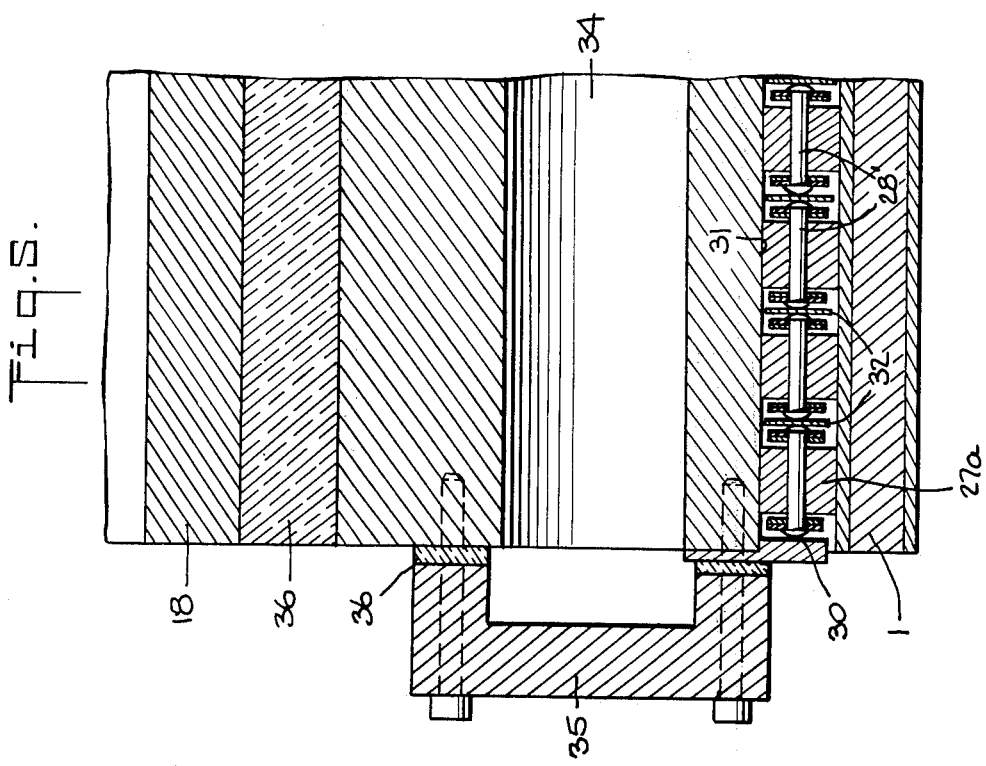
FIG. 5 is the same as FIG. 4 but shows the modification of divider steel strips separating adjacent chains.

Having reference now to FIGS. 4 through 6, the chain loops are shown as they appear with their spans running between the upper platen 18 and the upper flexible belt loop 1. The special roller chain loop arrangement of the present invention is not used in this instance, the chains entering the spanning length via semi-circular guiding surfaces 25 keyed to the ends of the platen 15 and looping in the manner of the lower chain loops. Inverting these FIGS. 4 through 6 provides a fairly clear representation of the lower platen and its anti-friction means.

As shown by FIGS. 4 and 6, each chain comprises inside link plates 26 between which steel rollers 27 are journaled on pins 28 passed through these plates, and outside link plates 29 through which the pins 28 also pass to form the chain. The outside plates have countersunk holes in which the ends of the pins are flared to provide the outside plates with smooth, flat plane surfaces beyond which the pin ends do not project. The rollers 27 are 12.77 mm. in diameter, as previously mentioned so it can be seen that FIGS. 4 through 6 are substantially full scale or 1:1 drawings. It can also be seen that the rollers are not substantially longer than their diameters. With the platen width being in the area of from 2 to 2.5 meters, and with each of the roller chains 27 having widths not much greater than the 12.77 roller diameter, plus the thickness of the relatively thin plates 26 and 29, there must be a very great number of the roller chains 24 which form the anti-friction bed interposed between the traveling steel strips and the platens.

Neither the lower rolling chain loop guiding elements 23 in FIG. 2 nor the elements 25 illustrated by FIG. 6, either drive or rotatively interlock the chains. Each chain is entirely individually free to travel at any velocity it may acquire independently with respect to the others and, of course, with respect to the steel strip belt spans. The chains are held transversely packed together and substantially intercontacting by end guides 30 fixed to the platens; because the chains outside plates 29 are smooth the chains can slide relative to each other when necessary. The rollers 27 are all individually very short as previously noted. Because the chains are capable of random movement relative to each other, their various rollers are substantially incapable of becoming transversely aligned to any great extent. As the steel strip belts locally deform or stretch, the velocities of the various chains in the affected areas can change individually so that no roller horizontal flexing, twisting or other strain can be involved, only the press force being carried. Localized belt stretching is due to the thinness of the steel strip belts which is in the area of from 1 to 1.5 mm. in thickness, and the driving tension on the belts.

As shown by all of FIGS. 4 through 6, the pressing surfaces 31 of the illustrated platens are flat plane surfaces free from any necessity for precision machined channels or rolling element races. The platen faces may be finished by inexpensive machining, and although preferably finished as smoothly as possible for obvious reasons, slight imperfections are relatively immaterial.

Note that the chain plates 26 and 29 do not carry any great tension, because the chains are undriven excepting by the rolling action the rollers receive from the traveling metal strip conveyor belts.

FIGS. 5 and 6 show the thin metal strips 32, which may be steel of about 1 mm. in thickness, which serve to separate the great multiplicity of roller chains without substantially increasing their transverse separating distances. This permits the use of roller chain pins 28' having ends projecting slightly beyond the outer surfaces of the outside plates 29. The edges of these strips 32 must be kept from being rubbed by the traveling steel strip belts and this can be done by letting their opposite ends project far enough beyond the platens for engagement by tensioning elements. One such tensioning element is schematically shown at 33 in FIG. 6. Incidentally, in the case of the lower roller chains 22 only the ends of these strips at the entrance end of the machine need be anchored because the motion of the chains keep the strips extended while gravity keeps them from engagement with the conveyor belts.

FIGS. 4 through 6 illustrate the platens as having transversely extending steam or hot liquid passages 34 which extend completely through the plates but have their ends interconnected by manifolds 35 which extend lengthwise on opposite sides of the press to provide for inlet and outlet flows. Thus, the platens are heated, the passages 34 being spaced far enough apart from each other to provide intervening areas of solid platen metal through which the pressing pressure from the transverse beams can travel safely. Thermal insulation 36 is used where appropriate, such as between the platens and the manifolds 35 and between the platens and the beams. These features apply to the lower platen assemblies as well.

Figure 8:
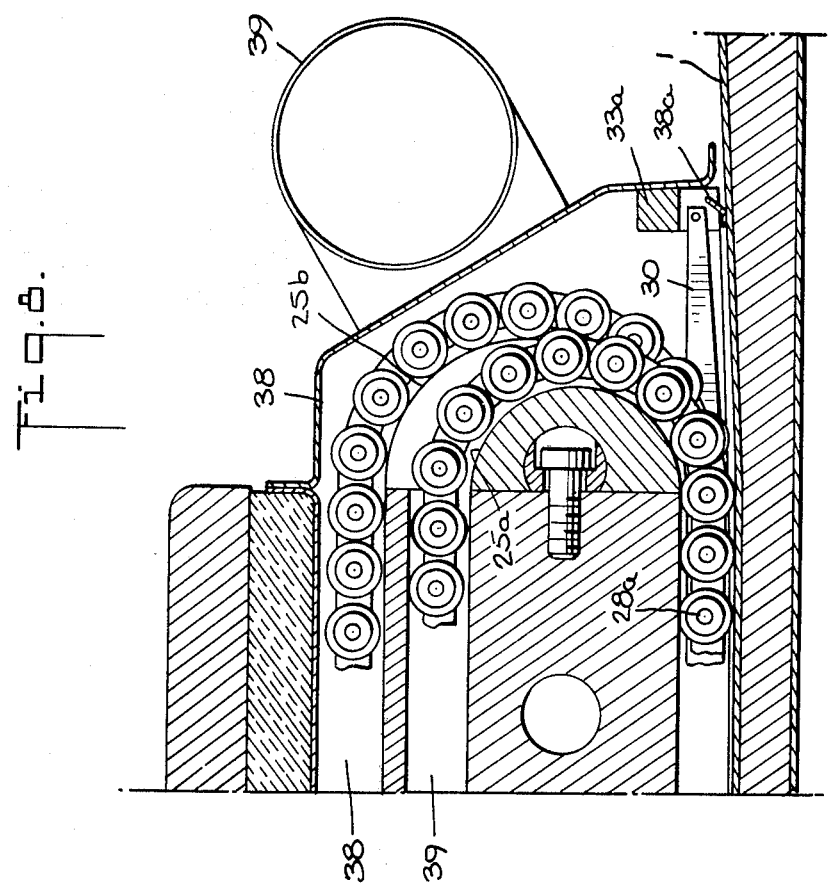

It was previously mentioned that in FIG. 2 a special loop return arrangement is used for the upper roller chains 24. This is illustrated by FIGS. 7 and 8. In this figure, the roller chains 24a are of a different construction than described before. Here each chain is a double width chain made from pairs of rollers 27a with the rollers in axial alignment as to each pair and journaled on common pins 28a and interconnected by links 26a, the flared or headed ends of the pins being in countersunk holes in the rollers so that the outer ends of the rollers of each pair are flat and smooth. The separating strips 32 previously described are used to separate the various chains and the chains are kept transversely packed together by end guides 30 as previously described. To illustrate a possibility, one of these strips shown at 32a is made high, or wide, enough to extend into a saw kerf 32b cut in the underside of the upper platen 15 which differs from the ones previously described principally only in that a sheet metal manifold 35a is shown instead of the much heavier one 35 illustrated before. With the strip 32a press fitted in the saw kerf 32b it is held upwardly so that only an immovable anchor 33a at the entrance end of the machine is needed even though in this instance the upper platen is involved. If the saw kerf 32b is widened in width, wedges may be used to hold the strip 32a in the saw kerf, thus eliminating any need for precision work. The sawing of such saw kerfs is a very simple operation as compared to the precision machining required to form bearing races.

The fundamental differences between FIGS. 7 and 8 and the constructions of the preceding figures, is that the semicircular guiding surface shown at 25 in FIG. 6 is made with alternately differing levels 25a and 25b, these levels being formed by grooves which start out at the same level and which as the rollers of the chains leave the steel strip belt 1, gradually diverge upwardly so that alternating roller chains arrive at or leave at different levels above the platen 15. Between the platen 15 and the upper beam 18 a metal plate 37 is interposed to handle these chain spans traveling at differing vertical heights. This plate 37 has longitudinally extending passageways 38 and 39 which are laterally offset transversely and vertically from one another at the alternately different levels required by the vertically separated upper chain spans. Therefore, the plate 37 can be and is made thick enough to provide adequate metal diagonally between the passageways 38 and 39 to safely carry the force exerted by the beams 18 and applied to the platen 15 through this plate 37, and the passageways 38 and 39 can be and are made to have greater heights than the diameters of the rollers of the chain spans so that these rollers do not have to carry the press force but can simply run loosely through their respective passageways. The width of the passageways 38 and 39 should provide just about enough clearance to permit the chain roller to roll along freely in the passageways. The heat from the heated platen 15 is conducted into this plate 37 for absorption by the rollers of the roller chains traveling through this plate's passageways, thus providing for greater heating efficiency.

Because of the possibility of dust and other contamination floating around this or any other continuous press, particularly when making wood-chip board, the space around the roller chains is protected from the outer atmosphere by shielding 38 provided with a flexible seal 38a where the strip belts enter or leave the press, and corresponding side edge seals 38b bearing on these belts. Thus the roller chains are fully enclosed and by providing the shielding 38 with a source of air under super-atmospheric pressure, the source being generally indicated at 39, contamination is prevented from entering the space enclosed around the roller chains. The seals 38a and 38b need not be air-tight, providing the source 39 introduces an adequate volume of air to the shielding 38 to maintain a super-atmospheric pressure surrounding the roller chains.

The above described construction where the idle spans of the roller chains are vertically separated, is preferably used only for the upper platen and the upper roller chain loops because as indicated by FIG. 2, the lower roller chain loops can be easily arranged to have clearance, permitting the use of chain guide constructions such as shown by FIG. 6.

Reference has been made to the roller chains being packed transversely together. This is intended to mean that the various roller chains are arranged as physically close together in a transverse direction as is possible, considering the endwise roller spacing required by the chain links and the separating or divider strips 32 and 32a if they are used. Such interspacing is adequately small for most purposes, but in the manufacture of certain products, such as for the sintering of sheets of polytetrafluorethylene, the existence of longitudinally running impressions may be possible, considering the fact that the conveyor belts are flexible.

The chance of the above described difficulty to occur is removed by the roller chain construction of the present invention shown by FIGS. 9 through 11 because the chains have sets of axially aligned rollers of different lengths, with longer rollers of one set opposite shorter rollers of the next set so that they effect transversely offset rolling paths free from transverse interspacing.

In FIG. 9 this is done by using special chains, each having pairs of rollers 40 and 41 journaled on common pins 42 as to each pair, the pins being interconnected by link plates 43 located between the rollers of each pair. These link plates differ from those shown in FIGS. 7 and 8 by having their portions which journal the pins 42 transversely offset as to mutually adjacent roller pairs and with these offset portions interconnected by a transverse portion located between the roller pairs. The rollers 40 are longer than the rollers 41 and their relationship is reversed alternately from pair to pair of the rollers so that spaces between the rolling paths of any pair of rollers are always immediately rolled over by one of the longer rollers 40.

With the roller ends made as flush or flat plane surfaces as previously described, these roller chains of FIG. 9 may be transversely packed together with their respective roller ends interengaging without any substantial danger of the chains interlocking with each other to destroy their individual ability to accelerate and decelerate relative to each other.

A further form of such chain construction is shown in FIG. 10 in the form of the chain having strands of straight links 44. These links in the upper strand however are not aligned in one lane parallel to the direction of advance but are offset, following one another, toward the same side. Thus for example the link 44a in FIG. 10 is offset upward relatively to the link 44. The link 44b is again offset upward relatively to the link 44a. The link 44c however is offset downward relatively to the link 44b, and is followed by four additional links each offset downward, as far as link 44d, after which an upward offsetting toward the right occurs. The complete strand of links thus runs in a zig-zag inside the chain 80, so that the gap left between any two rollers is rolled over by the following rollers.

The other or lower strand of links 82, has links off-set in the opposite direction relatively to the central plane of the chain. Each element of the chain therefore consists of three rollers which change periodically in width, or length, and which taken all together make a single roller chain with parallel smooth surfaced delimiting faces.

In FIG. 11 the links 45 are always offset in the same direction so that the link alignment runs diagonally through the chain with the lengths of the various rollers being proportioned as required by such displacement. As the diagonal orientation of the links must cause a link series to eventually end, it is necessary when this occurs to reverse the order in which the rollers decrease in length to start a new series. Thus in FIG. 11 there are two very short rollers 47 with two longer rollers 48 between them so that at this point it might be said that a quadruple width roller chain construction is involved. However, this next changes to a three roller width where a long roller 49 and two shorter rollers 47a start the three roller series. This progresses from the left-hand end to the right-hand end where the diagonally extending series roller links again phases out, with the rollers 47 and 48 again appearing as a four roller alignment. It can be seen that this construction also provides transversely overlapping rolling paths.

It is to be understood that the chains shown by FIGS. 9 through 11 will be transversely packed closely together as shown in FIG. 7 and that if the vertical separating strips are used between adjacent strands, these strips are of such great thinness as not to interfere substantially with the transversely uniform rolling action desired.

In all of the constructions shown by FIGS. 9 through 11 the transverse widths of the roller chains are substantially greater than in the case of the chains previously described and as they are shown by FIGS. 4, 5 and 6. The axially aligned rollers do require common roller linking pins as indicated at 50 in FIGS. 10 and 11, these incidentally showing how the pin ends can be flush or beneath the axial ends of the outermost ones of the rollers in all cases. However, FIGS. 9 to 11 are approximately full scale representations and it can be seen that the chains' widths are very small as compared to the overall widths of the conveyor belts and their pressing platens, the latter of which may well be in the area of one to several meters in extent. If the widths of the individual chains were to be increased so extensively that only a few of the chains would be required transversely, the principles of the present invention would not be involved.

Thus, an improved roller chain construction for use in a continuous press in which transverse interspacing is avoided has been shown.

We claim:

1. A roller chain of the type comprising a plurality of sets of rollers disposed one set behind the other longitudinally in their direction of advance, each set comprising at least two rollers disposed side by side on a pin with links joining successive sets of rollers and establishing the longitudinal spacing therebetween, in which the improvement comprises:
    a. the rollers on each individual pin spaced apart to form at least one gap; and
    b. the links disposed in and maintaining said gaps such that the gaps on successive sets of rollers when viewed longitudinally in the direction of advance of the chain do not form a straight path.

2. Apparatus according to claim 1, wherein said links are bent laterally between the rollers.

3. Apparatus as in claim 1 wherein said links comprise a chain of sequential links coupling each pair of adjacent rollers, each link in said chain being offset from the preceeding connecting link.

4. Apparatus as in claim 3, wherein the link offset is always in the same direction.

5. Apparatus as in claim 4, wherein said links are straight links.

6. Apparatus as in claim 5, wherein at a point where the offset chain of links approaches the edge of the roller chain, that chain of link is terminated and a new chain of links begun at the opposite edge of the roller chain.

7. Apparatus as in claim 6 wherein outer rollers of variable lengths are provided in each set the length of each roller selected so that the outer limiting surfaces of each side of the chain are always in a single plane.

8. Apparatus as in claim 7 wherein the outer rollers are supported in a cantilevered fashion.

9. Apparatus as in claim 8 wherein the roller pins on which the rollers are supported are countersunk into the end faces of the outer rollers.

10. Apparatus as in claim 3 wherein said offset alternates in one direction and the other thereby forming chains of links in a single chain having a zigzag path.

11. Apparatus as in claim 10 wherein two chains of links are provided with the direction of offset being opposite in each chain of link.

12. Apparatus as in claim 11 wherein outer rollers of variable lengths are provided in each set the length of each roller selected so that the outer limiting surfaces on each side of the chain are always in a single plane.

13. Apparatus as in claim 12 wherein the outer rollers are supported in a cantilevered fashion.

14. Apparatus as in claim 13 wherein the roller pins on which the rollers are supported are countersunk into the end faces of the outer rollers.

* * * * *